(12) United States Patent
Bodnar et al.

(10) Patent No.: US 7,920,684 B2
(45) Date of Patent: Apr. 5, 2011

(54) METHOD AND SYSTEM FOR PROCESSING CALL SETUP MESSAGES USING CALL ATTRIBUTES

(75) Inventors: Guillermo Bodnar, Chantilly, VA (US); Robert Barbiere, Randolph, NJ (US)

(73) Assignee: Arbinet-thexchange, Inc., New Brunswick, NJ (US)

( * ) Notice: Subject to any disclaimer, the term of this patent is extended or adjusted under 35 U.S.C. 154(b) by 1339 days.

(21) Appl. No.: 11/120,796

(22) Filed: May 3, 2005

(65) Prior Publication Data

US 2005/0207552 A1  Sep. 22, 2005

Related U.S. Application Data

(63) Continuation-in-part of application No. 10/638,456, filed on Aug. 11, 2003, now Pat. No. 7,447,645.

(60) Provisional application No. 60/567,066, filed on May 3, 2004.

(51) Int. Cl.
*H04M 3/42* (2006.01)

(52) U.S. Cl. .......... 379/201.01; 379/88.18; 379/126; 379/207.02; 705/7

(58) Field of Classification Search .......... 379/188, 379/211.02, 76, 88.18, 88.22, 88.24, 115.03, 379/127.01, 142.01, 142.05, 201.02, 201.12, 379/207.02, 229, 45, 221.04, 126, 201.1; 455/445; 709/238; 370/310, 352; 705/7
See application file for complete search history.

(56) References Cited

U.S. PATENT DOCUMENTS

| | | | |
|---|---|---|---|
| 5,195,126 A * | 3/1993 | Carrier et al. | 379/45 |
| 5,357,564 A * | 10/1994 | Gupta et al. | 379/188 |
| 5,442,689 A * | 8/1995 | Buttitta et al. | 379/229 |
| 5,450,482 A | 9/1995 | Chen et al. | |
| 5,590,186 A * | 12/1996 | Liao et al. | 379/211.02 |
| 5,646,982 A * | 7/1997 | Hogan et al. | 379/88.22 |
| 5,651,053 A * | 7/1997 | Mitchell | 379/210.02 |
| 5,719,930 A | 2/1998 | MacDonald et al. | |
| 5,757,899 A * | 5/1998 | Boulware et al. | 379/196 |
| 5,758,285 A * | 5/1998 | Chavez et al. | 455/445 |
| 5,930,344 A * | 7/1999 | Relyea et al. | 379/126 |
| 6,278,697 B1 * | 8/2001 | Brody et al. | 370/310 |
| 6,442,244 B1 * | 8/2002 | Fellingham et al. | 379/76 |
| 6,529,959 B1 * | 3/2003 | Armistead et al. | 709/238 |

(Continued)

OTHER PUBLICATIONS

Call Screening With SCS, Tekelec Whitepaper, Version 1.0, Jul. 1006.

(Continued)

*Primary Examiner* — Gerald Gauthier
(74) *Attorney, Agent, or Firm* — Cohen Pontani Lieberman & Pavane LLP

(57) ABSTRACT

A system for processing calls based on call attributes includes a call screening processor arranged for receiving a call setup message for placing a call between an originating switch and a dialed number. The call setup message contains basic network information including at least the number dialed and information related to the originating switch. The call screening processor matches the basic network information with data in a database in response to receiving a call setup message. The data in the database identifies call attributes of the call setup message based on the data matched to basic network information. The identified call attributes comprise call attributes comprise at least one of trunk ID, member ID, and destination. The call screening processor then processes the call setup message in accordance with the call attributes by appending data to the call setup message or altering the call setup message.

20 Claims, 4 Drawing Sheets

U.S. PATENT DOCUMENTS

| | | | |
|---|---|---|---|
| 6,553,109 B1* | 4/2003 | Hussain et al. | 379/207.02 |
| 6,697,461 B1* | 2/2004 | Middleswarth et al. | 379/88.24 |
| 6,826,274 B1* | 11/2004 | Murata et al. | 379/221.04 |
| 6,944,276 B1* | 9/2005 | Nguyen et al. | 379/142.02 |
| 7,079,638 B1* | 7/2006 | Beauchamp et al. | 379/196 |
| 7,110,513 B2* | 9/2006 | Halpern et al. | 379/115.03 |
| 7,203,293 B1* | 4/2007 | Bedingfield | 379/142.01 |
| 7,236,577 B2* | 6/2007 | Lection et al. | 379/142.05 |
| 7,257,209 B2* | 8/2007 | Gruchala et al. | 379/127.01 |
| 7,257,217 B1 | 8/2007 | Lee | |
| 7,280,530 B2* | 10/2007 | Chang et al. | 370/352 |
| 7,394,894 B2* | 7/2008 | Christie et al. | 379/188 |
| 7,412,046 B1* | 8/2008 | Cesario, Jr. | 379/201.12 |
| 7,447,645 B2* | 11/2008 | Spragle et al. | 705/7 |
| 2004/0032937 A1* | 2/2004 | Brady et al. | 379/115.03 |
| 2005/0207552 A1* | 9/2005 | Bodnar et al. | 379/201.01 |
| 2008/0279357 A1* | 11/2008 | Koch et al. | 379/201.02 |

OTHER PUBLICATIONS

Office Action dated Feb. 1, 2008 issued in corresponding U.S. Appl. No. 10/638,456.

* cited by examiner

METHOD AND SYSTEM FOR PROCESSING CALL SETUP MESSAGES USING CALL ATTRIBUTES

CROSS REFERENCE TO CORRESPONDING APPLICATIONS

The present application claims priority to U.S. Provisional Application No. 60/567,066, filed May 3, 2004, the entire content of which is incorporated herein by reference. The present application is also a Continuation-In-Part of U.S. patent application Ser. No. 10/638,456, filed on Aug. 11, 2003, now U.S. Pat. No. 7,447,645 the entire contents of which are incorporated herein by reference.

BACKGROUND OF THE INVENTION

1. Field of the Invention

The present invention relates to a method and system for processing calls using call attributes derived from a call setup message.

2. Description of the Related Art

Current telecommunications network systems do not distinguish between valid and invalid calls, e.g., calls with proper or improper destination codes. Consequently, telecommunications traffic from one carrier network to another is sent indiscriminately to each other and a carrier must rely on its switches to terminate valid phone calls and to reject invalid phone calls. Such traffic can impose a tremendous load on a telecommunications switch and other switch resources, which could ultimately fail from overstress or operate at reduced capacity due to congestion.

This problem becomes more acute in the telecommunications trading environment or other trading environments where multiple carriers are transmitting traffic to each other contemporaneously through a central switch node operated by the trading exchange. The central switch node, regardless of whether the calls are invalid or invalid, could become significantly degraded and prohibit phone calls from terminating, thereby resulting in loss of revenue opportunities for the trading exchange and its member carriers.

SUMMARY OF THE INVENTION

The present invention relates to a system for processing calls based on call attributes and includes a call screening processor arranged for receiving a call setup message from an originating switch in a network. The call setup message is a request for resources for placing a call between the originating switch and a dialed number. The call setup message contains basic network information including at least the number dialed and information related to the originating switch. The call screening processor matches the basic network information with data in a database in response to receiving a call setup message. The data in the database identifies call attributes of the call setup message based on the data matched to basic network information. The identified call attributes comprise call attributes comprise at least one of trunk ID, member ID, and destination. The call screening processor then processes the call setup message in accordance with the call attributes by appending data to the call setup message or altering the call setup message.

The call screening processor may be connected to a signaling transfer point of a signaling network for receiving the call setup messages. After processing the call setup message, the processed call setup message is transmitted back to the signaling transfer point. The signaling transfer point may, for example, be part of a SS7 network. Alternatively, the call screening processor may be connected for receiving the signaling messages directly, without the signaling transfer point.

The call screening processor may determine a specific service associated with the call setup message based on the call attributes and append a service ID to the call setup message, such that the call setup message is routed directly to the specific service.

The database may also includes data related to availability of network elements in a network group. In this case, the call screening processor determines whether the route requested by the call setup message is unavailable based on the data in the database. The call screening processor then alters the call setup request to request an available route.

The database may include information related to existing bearer channels and data paths. In this case, the call screening processor determines whether existing bearer channels or data paths are available for routing the call and alters the call setup request to request a route using the existing bearer channels or data paths. The originating switch may be arranged in a first network group, the destination node may be arranged in a destination network group, and the existing bearer channels or data paths may route the call through a third network group.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
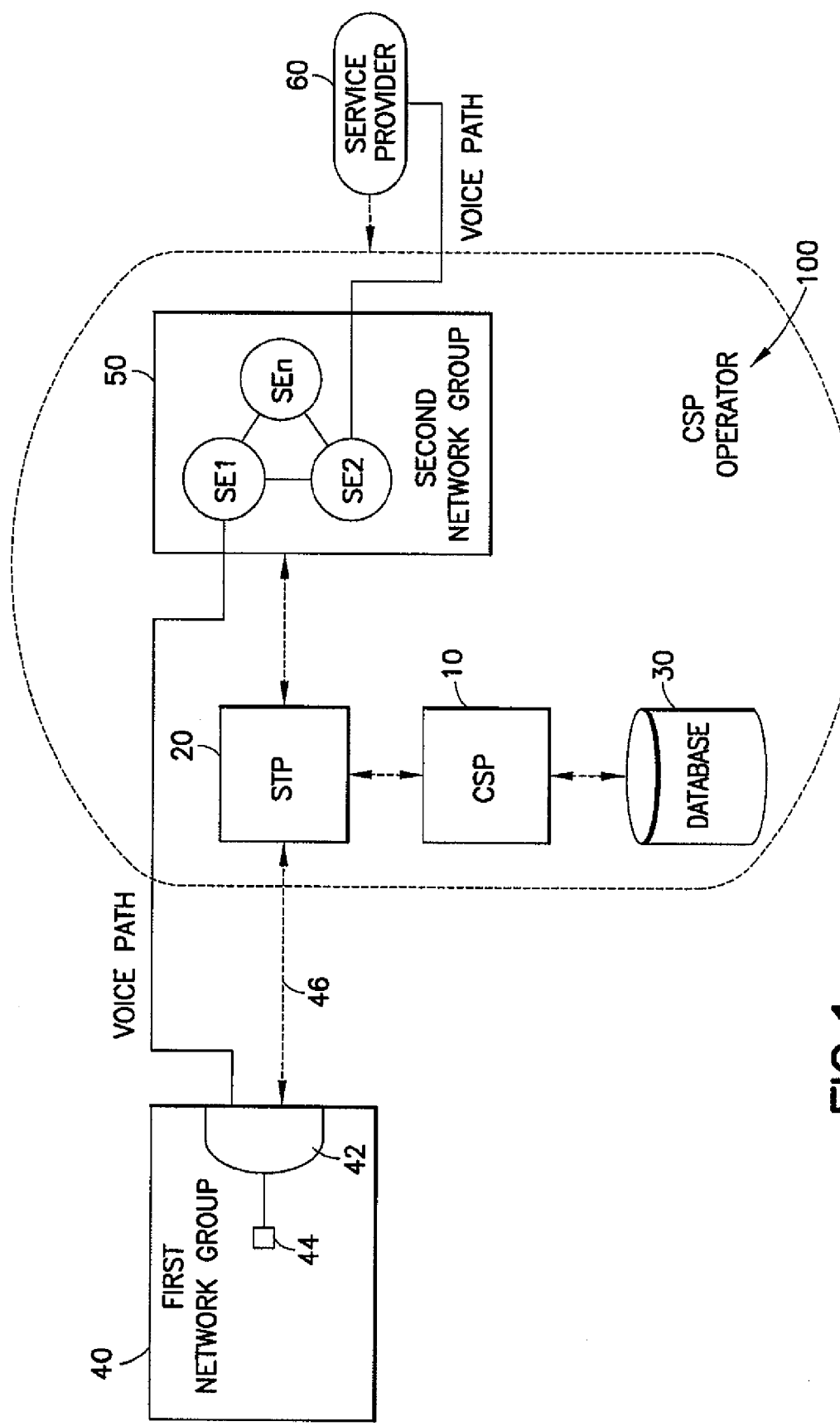
FIG. 1 is a schematic diagram showing a system including a call screening processor according to the present invention.

FIG. 1 is a schematic diagram showing the system according to an embodiment of the present invention. A call signal processor (CSP) 10 is connected to a signal transfer point (STP) 20 which is part of a signaling network such as, for example, a Signaling System 7 (SS7) network (not shown). The CSP 10 is connected to a database 30 including information (the type of information is described below). As shown in FIG. 1 a call setup message signal 46 is transmitted from an originating switch 42 in a first network group 40 after the originating switch receives a call from a terminal 44. The call destination is in a second network group 50. Each of the first and second network groups may be a network operated by a service provider or a portion of a network. In the embodiment of FIG. 1, a CSP operator 100 is shown as operating both the CSP 10 and the network group 50. However, the CSP operator may alternatively comprise an entity that does not operate any network resources. For example, the CSP operator may comprise a trading platform operator or other service provider. Furthermore, the CSP 10 shown as being connected for receiving the call setup message through the STP 20. However, the CSP 10 may also be connected for directly receiving the call setup message.

According to the invention, when the STP 20 receives the call setup message 46, instead of routing the call setup message, the STP 20 forwards the call setup message 46 to the CSP 10. The call setup message 46 includes basic network information such as the number dialed, automatic number information (ANI/CLI), and information about the originating switch 42. The CSP 10 determines whether the basic network information matches data records in the database 30. If the basic network information in the call setup message 46 does not match any data records in the database, the STP 20 processes the call setup message 46 for setting up a call to the destination. In FIG. 1 the signaling messages are depicted as dotted lines and the actual bearer channels or data paths are depicted as solid lines.

If the basic network information in the call setup message 46 does match data records in the database 30, then the CSP 10 uses the matching data from the database 30 to identify call attributes such as, example, trunk group ID, member ID, and destinations. The information in the database 30 may include an ENUM database which links telephone numbers, i.e., the dialed number, to Internet related destination or identities. Based on the call attributes, the CSP 10 determines how to process the call setup message 46. In the embodiment of FIG. 1, the CSP 10 determines that the call attributes are associated with a specific service. CSP 10 appends a service ID to the call setup message 46. The call setup message 46 with the appended service ID is then sent to the appropriate switch element 52a in network group 50 using the STP 20 and the switch processes the call setup message 46 by connecting the call directly to the provider 60 of the requested service. To provide such a service, the database 30 identifies at least one of market or call domain, originating operator account, originating caller account, service required, and translated number/terminating operator domain. The basic concept of this embodiment is to have the CSP 10 add information needed for routing to the call setup message 46 so that the network elements receiving the call setup message perform the routing tasks directly without requiring the interrogation of further databases to obtain additional information, thereby increasing the efficiency in handling of call setup message 46.

Figure 2:
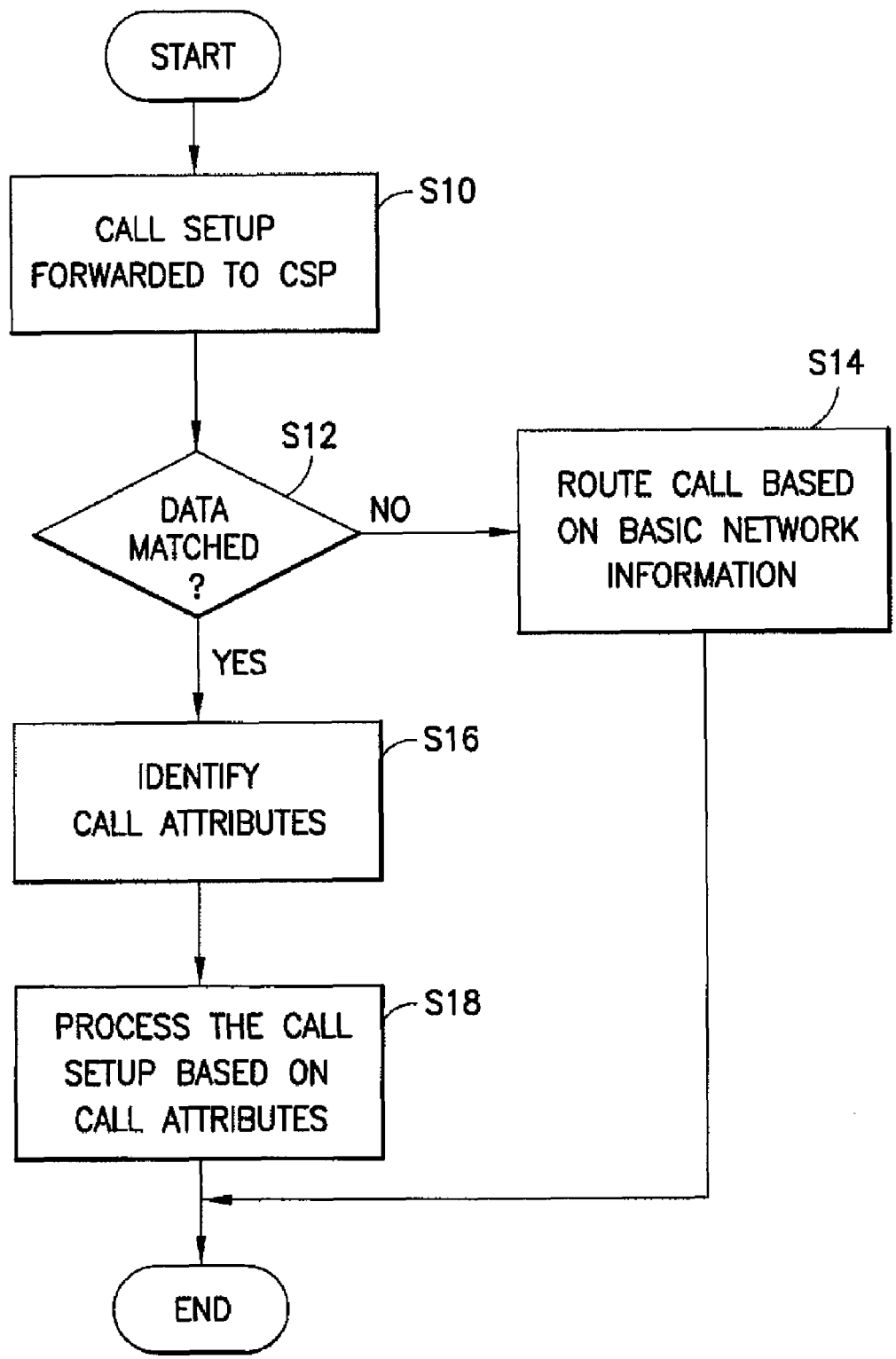
FIG. 2 is a flow diagram showing the basic steps of a method according to the present invention for processing call setup messages using a call screening processor.

The basic steps of the present invention are shown in FIG. 2. When a call setup message is received at an STP 20 to which a CSP 10 is connected, the call setup message is forwarded to the CSP 10, step S10. As described above, the CSP 10 may alternatively be arranged to receive a call setup message directly. The CSP 10 determines whether the basic network information in the call setup matches data in the database 30, step S12. If the basic network information in the call setup message 46 does not match any data in the database 30, the STP 20 routes the call setup message based on the basic network information in the call setup message, step S14. If the basic network information is matched with data in the database 30, the database 30 identifies call attributes associated with the basic network information, step S16. The CSP 10 then processes the call setup message 46 by applying a rule applicable to the identified call attributes, step S18. The rule may be a business rule for handling certain types of calls. In the example of FIG. 1, the rule relates identifies a service based on the call attributes and appends a service ID to the call setup message.

Figure 3:
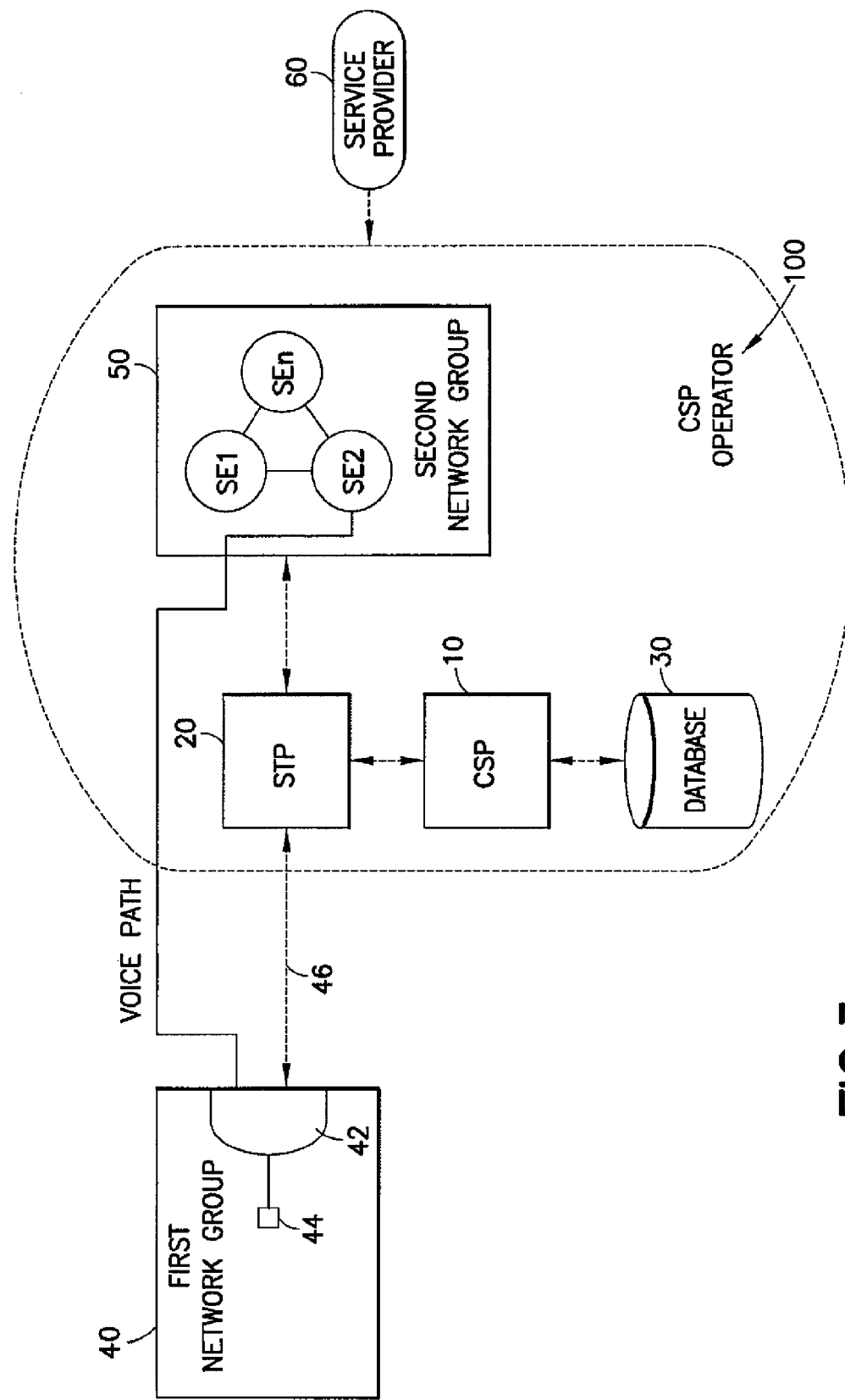
FIG. 3 is a schematic diagram showing another system according to the present invention.
Figure 4:
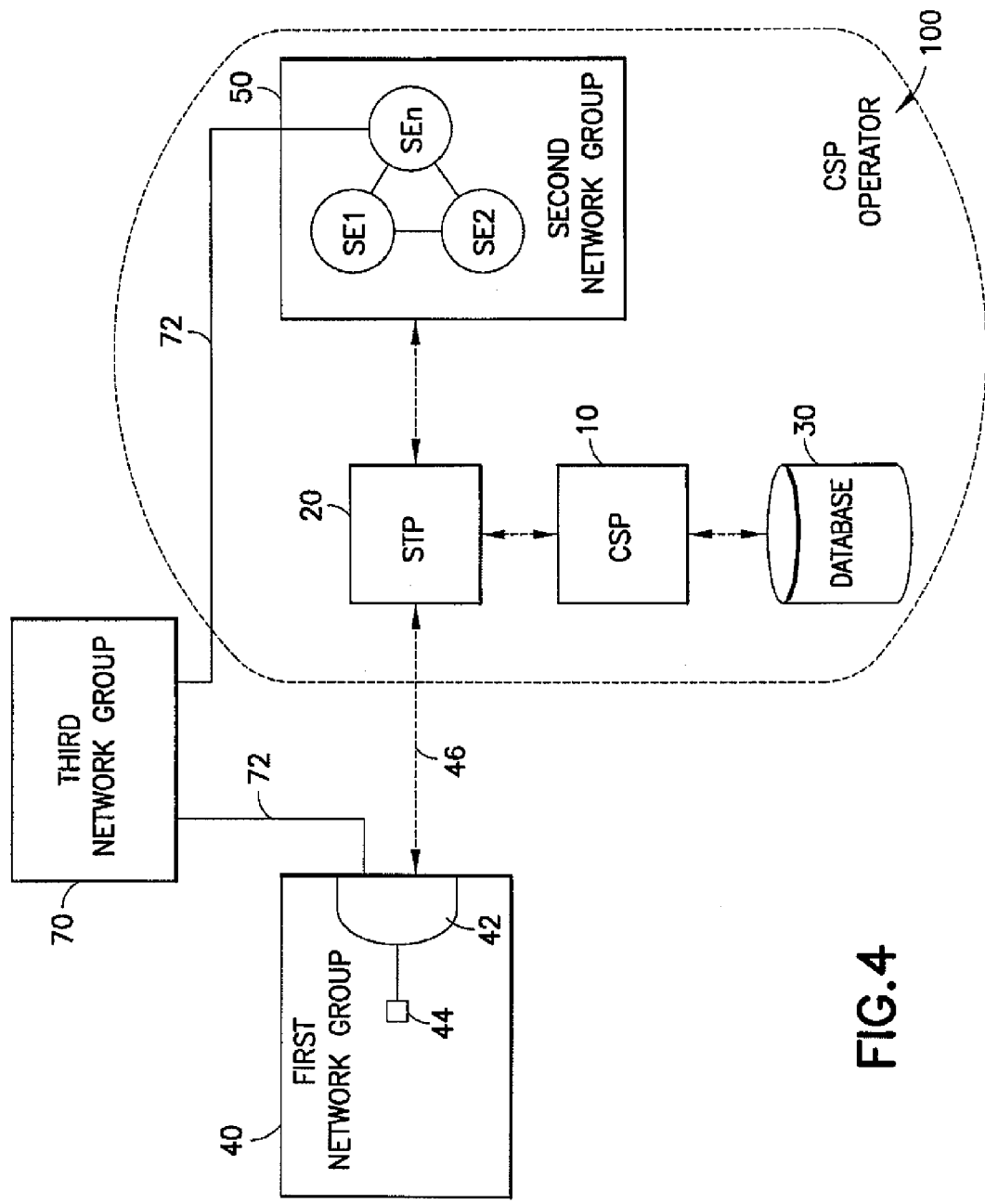
FIG. 4 is a schematic diagram showing yet another system according to the invention.

FIGS. 3 and 4 show further embodiments in which the rule applicable to the call attributes relates to altering the call setup message received from the originating switch 44 based on network conditions. In the embodiment of FIG. 3, the database 30 determines the availability of switch elements SE1-SEn in the second network group 50. The call setup message 46 received from the originating switch 44 requests a route to switch element SE1. The CSP 10 interrogates the database 30 upon receipt of the call setup message 46 and determines that the requested switch SE1 is not available. Instead of sending a message back to the originating switch indicating that the requested route is unavailable, the CSP 10 uses the database 30 to determine whether an alternative route is available to the destination in the call setup message. In the embodiment of FIG. 3, the CSP 10 determines that a route to the destination is available through switch element SE2. CSP 10 then alters the call setup message 46 to request a route through switch element SE2. The CSP 10 provide all routing data that is necessary for routing such that the network group 50 does not have to interrogate the routing tables to handle the call setup message. According to this embodiment of the present invention, the CSP 10 includes a rule for determining an alternate route when the originally requested route of the call setup message is not available.

In a further embodiment according to the invention shown in FIG. 4, the CSP 10 interrogates the database 30 to determine whether there are any existing routes available to the destination of the call setup message 46. In the specific example of FIG. 4, a route is available on existing bearer channel or data path 72 through a third network 70. Accordingly, the CSP 10 alters the call setup message to use the existing bearer channel or data path 72 such that the call is directed from the first network group 40 to the third network group 70 and then from the third network group 70 to the second network group 50. Accordingly, the rule applied by the CSP 10 in this case is to determine whether existing bear channels or data paths are available for routing the call requested by the call setup message. If an existing route is available, the network does not have to allocate further resources for effecting the call, thereby increasing availability of the network.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for processing calls based on call attributes, comprising the steps of:

receiving, by a call screening processor, signaling messages related to a call setup message transmitted by an originating switch, the signaling messages including at least basic network information comprising at least a number dialed and information relating to the originating switch;

identifying, by the call screening processor, call attributes of the call setup message based on the basic network information and information stored in a database;

determining, by the call screening processor, a rule applicable to the call attributes of the call setup message; and processing the call setup message according to the rule determined to be applicable to the call attributes.

2. The method of claim 1, wherein the rule includes identifying a service required by the call attributes of the call setup message and said step of processing comprises appending a service identification of the identified service to the call setup message.

3. The method of claim 1, wherein the rule includes determining an available route to the destination if the route requested by the call setup message is unavailable and said step of processing comprises altering the call setup message for the available route based on network availability.

4. The method of claim 1, wherein the rule includes determining existing bearer channels or data paths for the call setup message and said step of processing comprises altering the call setup message to use the existing bearer channels or data paths.

5. The method of claim 4, wherein the originating switch is arranged in a first network group, a destination node is arranged in a destination network group, and the existing bearer channels or data paths route the call through a third network group.

6. The method of claim 1, wherein the call attributes of the call setup message comprise at least one of market or call domain, originating operator account, originating caller account, service required, and translated number/terminating operator domain.

7. The system of claim 1, wherein the call attributes comprise at least one of trunk ID, member ID, and destination.

8. The system of claim 1, wherein said call screening processor is connected to a signal transfer point of a signaling network, said call screening processor receiving the signaling messages related to the call setup message from the signal transfer point.

9. The method of claim 8, wherein said signaling network is a SS7 network.

10. The method of claim 1, wherein the originating switch is arranged in a first network group and a destination node is arranged in a destination network group, wherein and operator of the call screening processor operator is the operator of one of the first network group and the destination network group.

11. A system for processing calls based on call attributes, comprising:

a call screening processor arranged for receiving a call setup message from an originating switch requesting resources for placing a call between the originating switch and a dialed number, the call setup message containing basic network information including at least the number dialed and information related to the originating switch; and a database connected to said call screening processor comprising data, said call screening processor being arranged and dimensioned for matching the basic network information with said data in said database in response to receiving a call setup message for identifying call attributes of the call setup message based on the data matched to basic network information and processing the call setup message in accordance with the call attributes.

12. The system of claim 11, wherein said call screening processor is arranged and dimensioned for receiving call setup messages from a signaling transfer point of a signaling network and transmitting the processed call setup message back to the signaling transfer point.

13. The system of claim 11, wherein the signaling transfer point is part of a SS7 network.

14. The system of claim 11, wherein said call attributes comprise at least one of trunk ID, member ID, and destination.

15. The system of claim 11, wherein said call attributes of the call setup message comprise at least one of market or call domain, originating operator account, originating caller account, service required, and translated number/terminating operator domain.

16. The system of claim 11, wherein said call screening processor is arranged and dimensioned for determining a specific service based on the call attributes and appending a service ID to the call setup message, such that the call setup message is routed directly to the specific service.

17. The system of claim 11, wherein said database includes data related to availability of network elements in a network group, said call screening processor is arranged and dimensioned to determine whether the route requested by the call setup message is unavailable based on the data in said database, determining an available route to the destination if the requested route is unavailable, and altering the call setup request to request the available route.

18. The system of claim 11, wherein the database includes information related to existing bearer channels and data paths, said call screening processor is arranged and dimensioned for determining whether existing bearer channels or data paths are available for routing the call, and altering the call setup request to request a route using the existing bearer channels or data paths.

19. The system of claim 18, wherein the originating switch is arranged in a first network group, a destination node is arranged in a destination network group, and the existing bearer channels or data paths route the call through a third network group.

20. The system of claim 11, wherein the database includes an ENUM database.

* * * * *